(12) United States Patent
Mangal

(10) Patent No.: US 7,313,107 B1
(45) Date of Patent: Dec. 25, 2007

(54) METHOD AND SYSTEM FOR MULTICASTING MESSAGES TO WIRELESS TERMINALS

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 597 days.

(21) Appl. No.: 10/829,704

(22) Filed: Apr. 22, 2004

Related U.S. Application Data

(63) Continuation-in-part of application No. 09/993,213, filed on Nov. 16, 2001, now Pat. No. 7,075,904.

(51) Int. Cl.
*H04Q 7/00* (2006.01)

(52) U.S. Cl. ...................... 370/328; 370/349

(58) Field of Classification Search ............... 370/349, 370/328
See application file for complete search history.

(56) References Cited

U.S. PATENT DOCUMENTS

| | | | |
|---|---|---|---|
| 5,887,252 A | 3/1999 | Noneman | |
| 6,104,709 A | 8/2000 | Rinchiuso et al. | |
| 6,215,790 B1 | 4/2001 | Voit et al. | |
| 6,625,773 B1 | 9/2003 | Boivie et al. | |
| 6,781,999 B2 | 8/2004 | Eyuboglu et al. | |
| 6,856,604 B2 | 2/2005 | Lundby | |
| 2001/0003706 A1 | 6/2001 | Warburton et al. | |
| 2003/0026240 A1* | 2/2003 | Eyuboglu et al. | ........... 370/349 |
| 2003/0087653 A1 | 5/2003 | Leung et al. | |
| 2004/0043770 A1 | 3/2004 | Amit et al. | |

FOREIGN PATENT DOCUMENTS

WO    WO 98/03002    1/1998

OTHER PUBLICATIONS

U.S. Appl. No. 09/993,213, filed Nov. 16, 2001 entitled "Method and System for Multicasting Messages to Select Mobile Recipients".

International Search Report from International Application No. PCT/US02/30131, dated Dec. 9, 2002.

(Continued)

*Primary Examiner*—Rafael Perez-Gutierrez
*Assistant Examiner*—Charles Shedrick

(57) ABSTRACT

A method and system for multicasting messages to wireless terminals. A multicast radio-packet link is established between a packet gateway and a base station system respectively for each cell sector served by the packet gateway. Each multicast link has an active state when any wireless terminals in the corresponding cell sector are in a multicast state prepared to receive multicast messages, and an inactive state when no wireless terminals in the corresponding cell sector are in the multicast state. When the packet gateway receives a multicast message, it sends the message over each active multicast link but not over any inactive multicast link. Thus, a single copy of the multicast message can conveniently be sent just to each of the cell sectors that is currently serving at least one wireless terminal that is in a multicast state.

11 Claims, 7 Drawing Sheets

OTHER PUBLICATIONS

International Preliminary Examination Report from International Application No. PCT/US02/30131, dated Jun. 19, 2003.

ZTE, ZTE Push-to-Talk Solution, Oct. 2003.

TR45, Wireless IP Architecture based on IETF Protocols PN-4286-A (to be published as TIA/EIA/TSB-115), Jun. 6, 2000.

Tao Chen et al., "cdma2000 Broadcast Services Stage 2: System Design", Qualcomm Incorporated, Samsung Electronics Co, Ltd., SK Telecom, 2001.

Office Action from U.S. Appl. No. 10/830,376, filed Dec. 16, 2005.

* cited by examiner

| CELL SECTOR | COUNT OF WIRELESS TERMINALS IN MULTICAST STATE | MULTICAST LINK STATUS |
|---|---|---|
| A | 0 | INACTIVE |
| B | 1 | ACTIVE |
| C | 0 | INACTIVE |

FIG. 5

METHOD AND SYSTEM FOR MULTICASTING MESSAGES TO WIRELESS TERMINALS

RELATED APPLICATION

This application claims priority as a continuation-in-part to patent application Ser. No. 09/993,213, entitled "Method and System for Multicasting Messages to Select Mobile Recipients" listing Manish Mangal and Kevin R. O'Connor as inventors, filed Nov. 16, 2001, the entirety of which is hereby incorporated by reference.

BACKGROUND

1. Field of the Invention

The present invention relates to wireless networks and, more particularly, to a method and system for multicasting messages to wireless terminals in such networks.

2. Description of Related Art

In a typical cellular wireless network, a geographic area is divided into cell sectors. Each cell sector defines a geographic area in which wireless terminals (such as cellular telephones, personal digital assistants (PDAs) and/or other devices) operate. The wireless network normally has a base transceiver station (BTS) assigned to one or more cell sectors. The BTS produces a radio frequency (RF) radiation pattern over the one or more cell sectors. The RF radiation pattern allows the wireless terminals located in the one or more cell sectors to exchange signals with the BTS over an air interface.

The wireless network typically has a plurality of BTSs. The plurality of BTSs communicates concurrently with a base station controller (BSC) that aggregates signals received from the plurality of BTSs. The plurality of BTSs and the BSC is commonly referred to as a base station. And the wireless network may have a plurality of base stations. The plurality of base stations in the wireless network is referred to as a base station system (BSS).

Each BSC in the wireless network may communicate with a packet gateway and a mobile switching center (MSC). The packet gateway and the MSC function to set up and connect calls with other entities. For example, the packet gateway may set up and connect calls with a server or other entity on an Internet protocol (IP) network, and the MSC may set up and connect calls with a telephone on a public switched telephone network (PSTN).

Generally, the BSC will assign a traffic channel to each wireless terminal for transmitting and receiving signals over the air interface. Additionally, the packet gateway establishes a radio-packet (R-P) link with the BSC. The R-P link carries signals between the packet gateway and the BSC. The packet gateway establishes a separate R-P link for each wireless terminal in the wireless network, and in this regard, the signals carried by each R-P link are associated with a particular wireless terminal. The R-P link is referred to as the A10/A11 link in the code division multiple access (CDMA) network architecture.

In some instances, a server in the wireless network may send information to wireless terminals in the wireless network. The information may be of interest to users of the wireless terminals. For example, the information might be sports scores, weather reports, and advertising messages. The server may insert the information into a message and send the message to one or more wireless terminals.

In order to facilitate convenient distribution of a given message to multiple wireless terminals, the packet gateway may maintain a list of wireless terminals authorized to receive a copy of the message. A single copy of the message may then be sent to the packet gateway, and the packet gateway may determine from its list which wireless terminals are authorized to receive a copy of the message. The packet gateway may then transmit a copy of the message respectively to each such wireless terminal, via the wireless terminal's respective R-P link (to the BSS, which then transmits the message to the wireless terminal). In this way, the wireless network is able to send the message to multiple wireless terminals in response to just one copy of the message being sent to the packet gateway.

SUMMARY

The present invention is directed to an improved method and system for sending messages to one or more wireless terminals. Instead of sending a copy of a message to each wireless terminal over the terminal's respective R-P link, a wireless network will send a message over a special multicast R-P link to a given cell sector (or other such coverage area) for receipt by one or more authorized wireless terminals currently operating in that cell sector. The multicast R-P link may be referred to more generally as a "multicast link."

The wireless network may be arranged to have a plurality of multicast links, preferably one for each cell sector served by a given packet gateway. Each multicast link carries messages between the packet gateway and the BSS to wireless terminals in a particular cell sector of the wireless network. Thus, a copy of the same message might not have to be sent over individual R-P links to the wireless terminals in a particular cell sector of the wireless network. Rather, a single copy could simply be sent over a multicast link to the wireless terminals in the cell sector served by the multicast link.

In accordance with an exemplary embodiment of the invention, each wireless terminal can have a multicast state and a non-multicast state. When a terminal is in the multicast state, the terminal is arranged to receive messages sent over the multicast link of the cell sector in which the terminal is operating, and when a terminal is in the non-multicast state, the terminal is not arranged to receive messages sent over the multicast link of the cell sector in which the terminal is operating.

Further, each multicast link will preferably have an active state and an inactive state. When a multicast link of a given cell sector is in the active state, the packet gateway would send multicast messages via the multicast link to that cell sector. And when a multicast link of a given cell sector is in the inactive state, the packet gateway would not send multicast messages via the multicast link to that cell sector.

In a situation where a cell sector currently serves no wireless terminals that are in the multicast state, there would be no need to send messages over the multicast link for that cell sector. However, in a situation where a cell sector currently serves at least one wireless terminal that is in the multicast state, it would make sense to send messages over the multicast link for that cell sector.

Thus, in accordance with the exemplary embodiment, when one or more wireless terminals in a given cell sector are in the multicast state, the multicast link for that cell sector will be placed in the active state. Messages would then be sent over the multicast link for that cell sector, so that the one or more wireless terminals could receive the message. On the other hand, when no wireless terminals in a given cell sector are in the multicast state, the multicast link for that cell sector will be placed in the inactive state, so that messages are not sent over the multicast link to the cell sector.

Further, in accordance with the exemplary embodiment, if a wireless terminal in a multicast state enters a cell sector whose multicast link is currently in the inactive state, then the multicast link for that cell sector will transition into an active state. Messages may then be sent over the cell sector's multicast link for receipt by that wireless terminal. On the other hand, once the last wireless terminal in the multicast state leaves a cell sector whose multicast link is currently in the active state, the multicast link for that cell sector will transition into an inactive state. Messages would then not be sent over the cell sector's multicast link, since no wireless terminals in the multicast state are present in the cell sector to receive such messages.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 5 is a sector-state table for use in managing active and inactive status of multicast radio-packet links;

DETAILED DESCRIPTION OF AN EXEMPLARY EMBODIMENT

1. Exemplary Architecture

Figure 1:
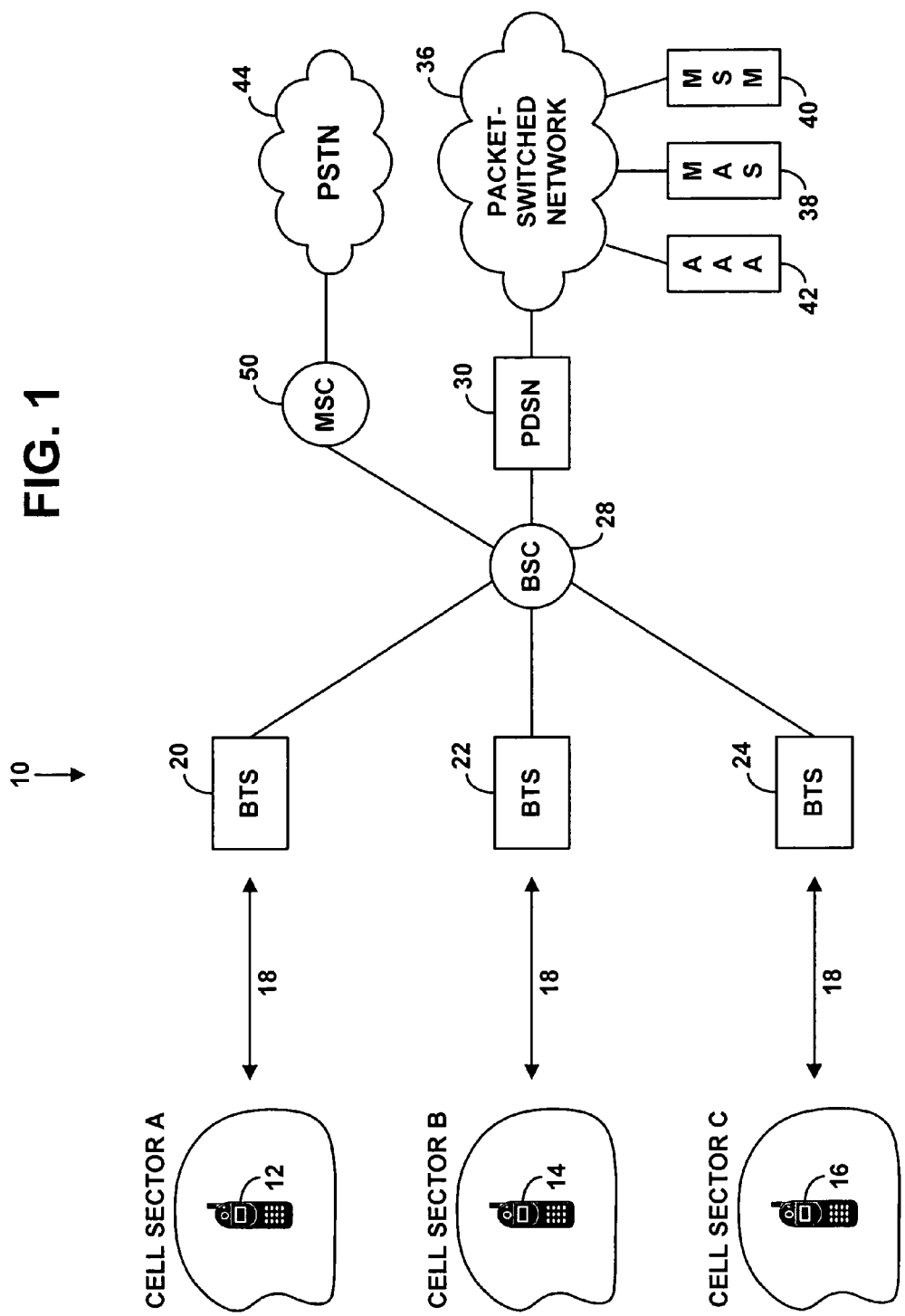
FIG. 1 is a simplified block diagram of an exemplary wireless network.

Referring to the drawings, FIG. 1 is a simplified block diagram of a wireless network 10. It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

As shown in FIG. 1, the exemplary network 10 may include wireless terminals 12, 14, 16 and a BSS. The wireless terminals may take the form of cellular telephones, wireless modems, wireless PDAs, or two-way pagers, for example, and the BSS may include BTSs 20, 22, and 24 and BSC 28. The network may also have a packet data serving node (PDSN) 30, such as a CommWorks® Total Control® 2000 or the like, an MSC 50, a PSTN 44, and a packet-switched network 36 (e.g., the Internet, or a private packet network), as in conventional cellular networks.

The wireless terminals 12, 14, 16 may be communicatively coupled with BTS 20, 22, and 24 as shown, via an air interface 18 (or separate air interfaces). The wireless terminals 12, 14, 16 may communicate with BTS 20, 22, 24 over the air interface 18 by an air interface protocol as set forth in the TIA/EIA/IS-2000 standard, but the particular air interface protocol is not necessarily critical to operation of the present invention.

The BSS produces one or more radiation patterns that defines one or more cell sectors A, B, C of the wireless network. The radiation pattern(s) enable the wireless terminals 12, 14, 16 to exchange signals with the BSS over the air interface 18. The wireless terminals 12, 14, 16 operate in one of the cell sectors A, B, C, and can move between the cell sectors, preferably without communication with the BSS being disrupted.

PDSN 30 provides an interface into the packet-switched network 36 and may thus constitute a packet gateway. In particular, PDSN 30 may interface between radio network communications (via BSC 28) and communications on packet-switched network 36.

Figure 2:
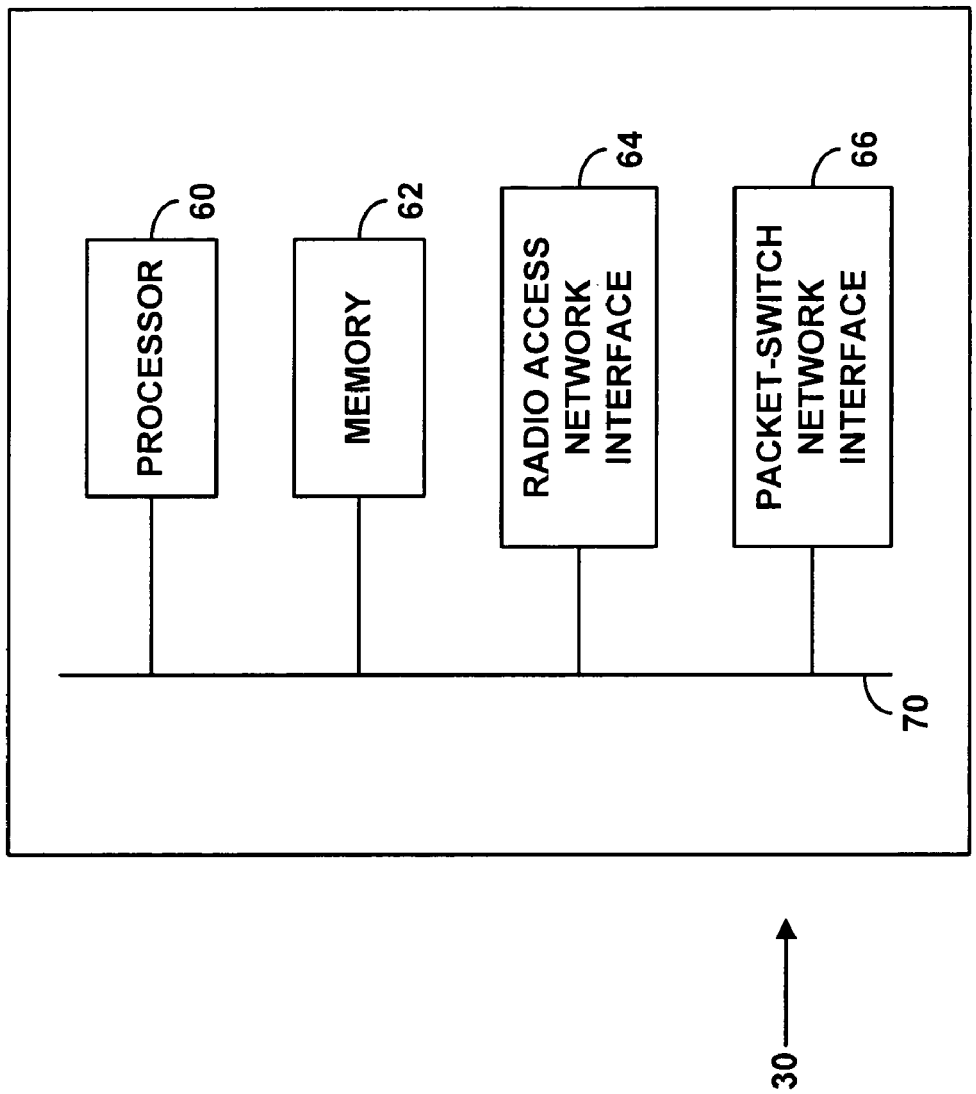
FIG. 2 is a simplified block diagram of a packet gateway in the exemplary embodiment.

FIG. 2 is a simplified block diagram of the packet gateway or PDSN 30. The PDSN 30 shown in FIG. 2 may have a processor 60, memory (i.e., data storage generally) 62, a radio access network interface 64, and a packet-network interface 66 (e.g., EdgeServer® card), which may be coupled together by a system bus 70. The radio access network interface 64 may include one or more ports for exchanging signals with the BSS and the packet-network interface 66 may include one or more ports for exchanging signals with the packet-switched network 36. Processor 60 may comprise one or more general purpose and/or dedicated processors. Memory 62 may include more than one physical element, such as built-in ROM, RAM, a hard disk, an optical drive, a removable memory device, etc. and may also include a set of stored logic (e.g., computer instructions) executable by processor 60 to transmit and receive signals over the radio access network and over the packet switched network.

The particular configuration shown in FIG. 2 is not necessarily critical to the functioning of all embodiments of the present invention. For example, the PDSN 30 could be implemented in an integrated circuit having the memory 62 and processor 60 instead of the processor 60 and the memory 62 being implemented on separate circuits. Other arrangements are also possible.

In a conventional manner, wireless terminals 12, 14, 16 can gain packet-data connectivity so as to be able to engage in packet-data communication. For instance, a wireless terminal may send a packet-data origination request to MSC 50, which MSC 50 may forward back to BSC 28. BSC 28 may then assign a traffic channel (radio link) for use by the wireless terminal. Further BSC 28 may forward the request to PDSN 30, which may then enter into a data link layer connection (e.g., point to point protocol session) with the wireless terminal and, through interaction with a home agent (not shown) or other entity, assign a mobile IP address to the wireless terminal.

In the exemplary embodiment, a multicast application server (MAS) 38, an authentication, authorization, accounting (AAA) server 42, and a multicast session manager (MSM) 40 may be communicatively coupled to packet-switched network 36 (and thus ultimately to the BSS via PDSN 30). It should be noted that MSM 40, AAA server 42, and MAS 38 are functional entities, and any or all of the functions performed by these entities could be integrated into a single entity (or other, multiple entities that perform one or more of the functions in combination). Furthermore, the MSM 40, AAA server 42, and MAS 38 could be directly coupled to the PDSN 30 rather than via packet-switched network 36. Other arrangements are also possible.

MAS 38 generally functions to send multicast messages to destinations such as the wireless terminals 12, 14, 16. More particularly, MAS 38 may insert information into a multicast message (e.g., IP-based messages) and also insert a particular destination address (e.g., IP destination address) into the message. In the exemplary embodiment, a given wireless terminal will be arranged to pay attention to multicast messages destined to one or more particular multicast addresses, and to disregard other multicast messages. (The wireless terminal will effectively discard or "not receive" messages that are destined to an address to which the wireless terminal is not arranged to pay attention.) Thus, MAS 38 could send a multicast message to a given group of wireless terminals by directing the message to a multicast address to which the wireless terminals are arranged to pay attention.

MSM 40 generally functions to manage multicast group memberships. When a wireless terminal joins a given multicast group, MSM 40 could notify the wireless of what address(es) the wireless terminal should listen to, and/or MSM 40 could send to the wireless terminal a key, filter or mask (e.g., an encryption key) that the wireless terminal could use as a basis to read information from such multicast messages. Thus, upon joining a given multicast group, a wireless terminal could begin listening to a designated multicast address and could begin receiving information in such multicast messages.

MSM 40 may be in communication with AAA server 42, and AAA server 42 may function to authorize wireless terminals to join multicast groups. AAA server 42 may be a conventional wireless component as described in Interim Standard (IS) 2000 for a third-generation wireless system. AAA server 42 generally maintains account and authorization information as well as user profiles for wireless terminals served by the BSS. For purposes of the present invention, AAA server 42 could maintain a record of which, if any, wireless terminals are authorized to receive given multicast messages (e.g., to be members of particular multicast groups), with various restrictions, such as for how long. The AAA server 42 could update its record at the end of a billing period so that any user that wishes to terminate a service at the end of the billing period can do so.

According to the exemplary embodiment, a separate multicast link will be in place between the PDSN 30 and the BSS respectively for each cell sector served by the PDSN. The multicast link is preferably an R-P link of the same type that would normally be established for carrying packet-data to and from a given wireless terminal, but a multicast R-P link will instead serve a given cell sector and thus possibly multiple wireless terminals operating in the cell sector. Multicast data (e.g., from MAS 38) can thus be sent on a given cell sector's multicast link from the PDSN to the BSS and then transmitted (broadcast) by the BSS to wireless terminals operating in that cell sector.

To facilitate transmission of multicast data to more than one wireless terminal in a given cell sector, the cell sector can have a reserved multicast radio link (e.g., a given Walsh code and/or other sort of traffic channel). When the BSC 28 serving that cell sector receives multicast data on the multicast R-P link from the PDSN 30, the BSC 28 may then programmatically transmit that multicast data on the multicast radio link for that cell sector. Further, when a wireless terminal is in the multicast state, it will programmatically begin listening for data on that multicast radio link. Thus, any wireless terminals in the cell sector that are listening for data on that multicast radio link may then receive the data transmission.

Figure 3:
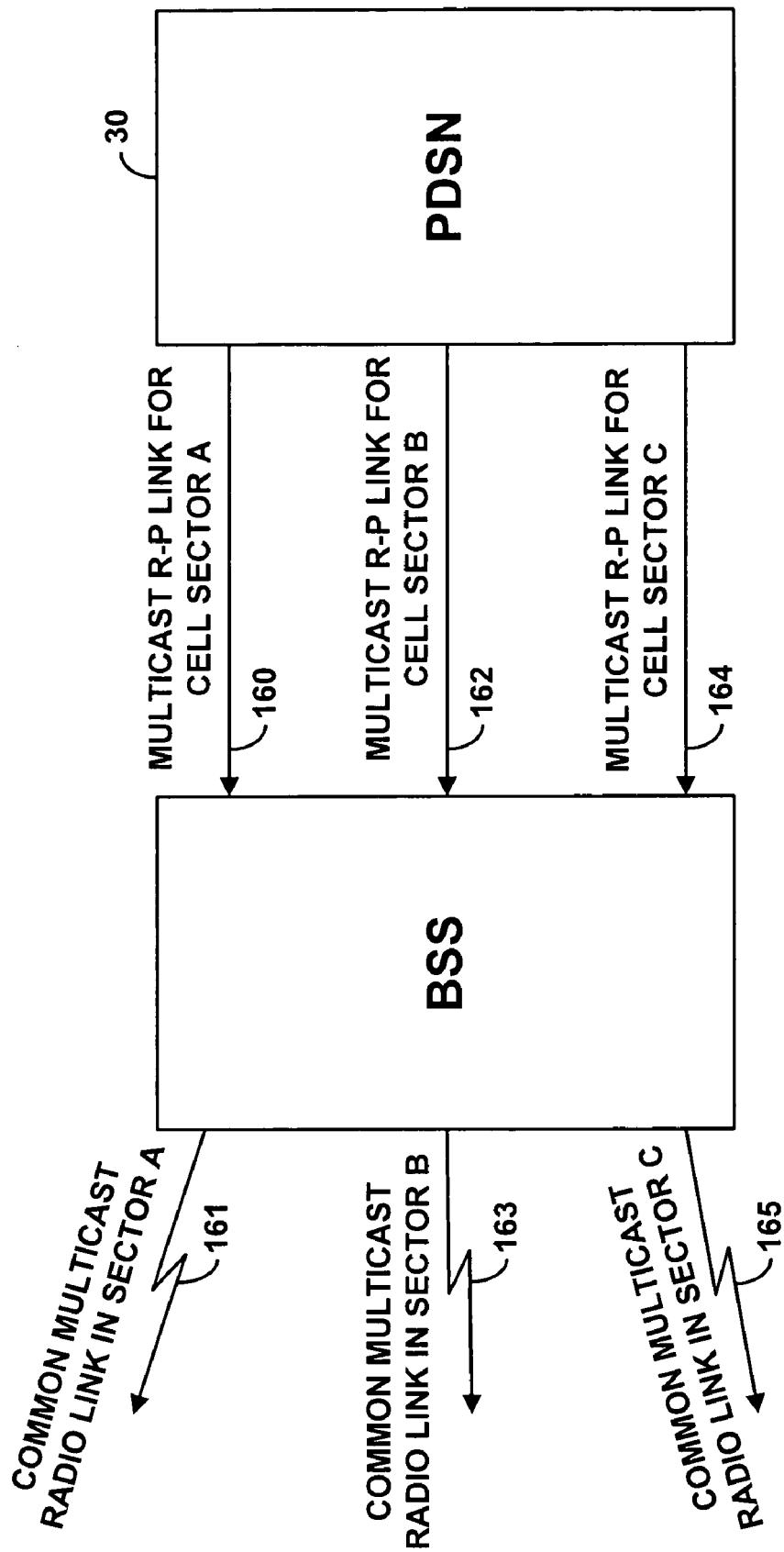
FIG. 3 is a block diagram illustrating multicast links in the exemplary embodiment.

FIG. 3 depicts an arrangement of discrete multicast R-P links and common radio links in the context of FIG. 1. As shown in FIG. 3, three example multicast R-P links 160, 162, 164 exist between the PDSN and the BSS. Multicast R-P link 160 is in place for cell sector A, multicast R-P link 162 is in place for cell sector B, and multicast R-P link is in place for cell sector B. Further, three example common multicast radio links 161, 163, 165 are reserved by the BSS (e.g., by BSC 28) for use in transmitting multicast data into the cell sectors. Common multicast radio link 161 is reserved for transmitting multicast data from multicast link 160 into cell sector A, common multicast radio link 163 is reserved for transmitting multicast data from multicast link 162 into cell sector B, and common multicast radio link 165 is reserved for transmitting multicast data from multicast link 164 into cell sector C. (In an alternative embodiment, these radio links could be reserved just when needed and free for other use when not needed.)

The PDSN 30 may establish the multicast link for each cell sector of the wireless network when the PDSN 30 is powered up or whenever a message needs to be sent over the multicast link, for example. The PDSN 30 may engage in A10/A11 protocol signaling to establish a multicast link between the PDSN 30 and the BSS for a given cell sector, in the same way that a PDSN normally engages in A10/A11 protocol signaling to establish an R-P link for use with respect to a given wireless terminal. For instance, the PDSN 30 may send an A-11 registration request to the BSS. In turn, the BSS may send an A-11 registration reply to the registration request, and the PDSN 30 may send an A-11 registration acknowledgement. The A-11 registration acknowledgement may indicate that the multicast link for a cell sector of the wireless network has been established. The PDSN 30 may repeat the A-11 signaling so that a multicast link is established for each cell sector of the wireless network (i.e., for each cell sector served by the PDSN).

2. Exemplary Operation a. Overview

In the exemplary embodiment, wireless terminals operating throughout the wireless network may receive multicast messages that are sent to a multicast group of which the wireless terminals are members. To accomplish this, MAS 38 will send the multicast message to PDSN 30, and PDSN 30 will send the multicast message along each active multicast link (if any) to the BSS, i.e., along the multicast link of each cell sector that is currently serving a wireless terminal in the multicast state. The BSS will then transmit the multicast message on the common multicast radio link into the cell sector associated with the multicast link. And each member wireless terminal in that cell sector will thus receive the multicast message transmitted on that common multicast radio link.

b. Joining a Multicast Group

Figure 4:
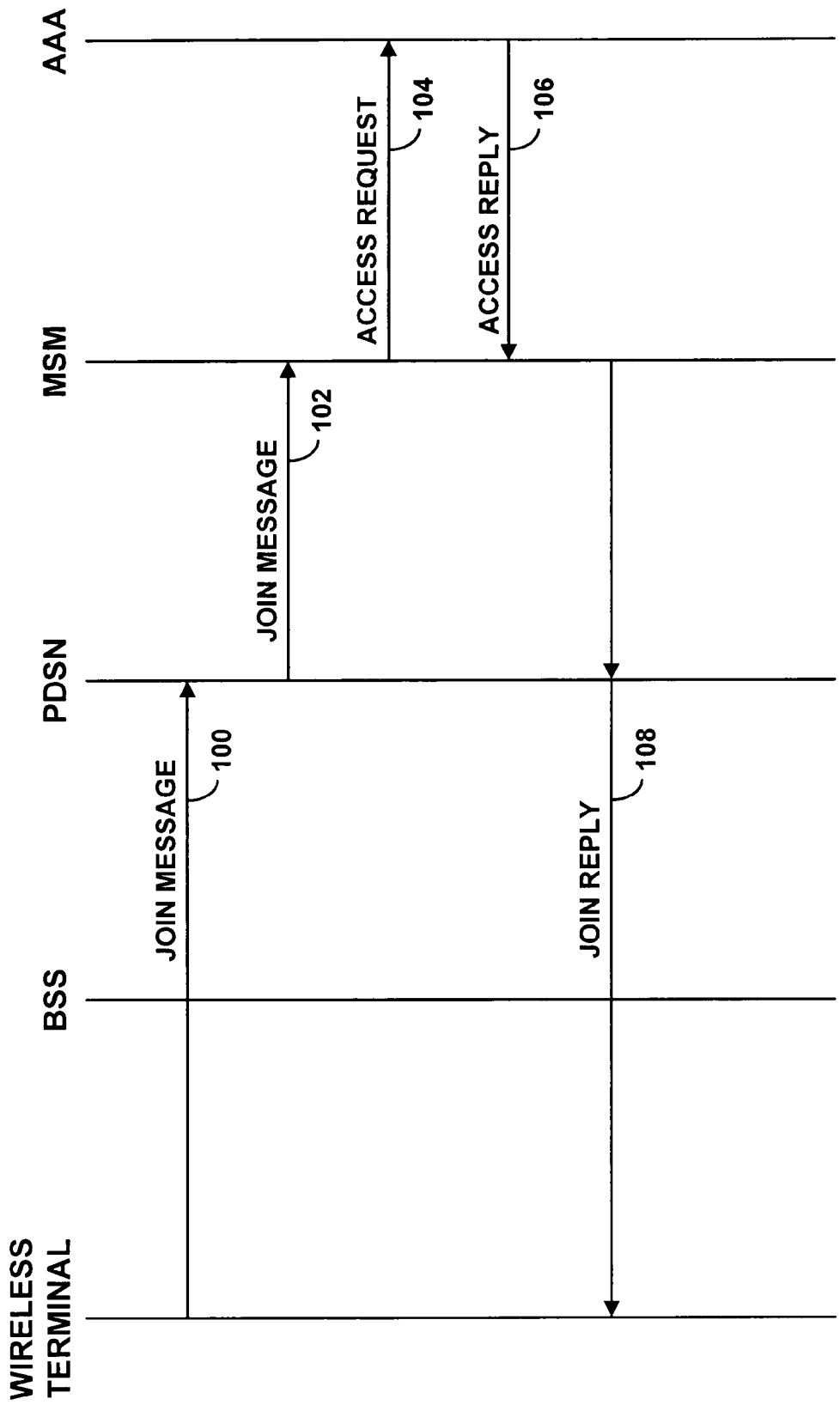
FIG. 4 is a call flow depicting signals exchanged to join a wireless terminal into a multicast group.

In order for a wireless terminal to be able to receive multicast messages sent by MAS 38, the wireless terminal will first "join" a multicast group, so as to become authorized to receive the multicast messages. FIG. 4 is call flow depicting a process that can be carried out in order to join a wireless terminal into a multicast group, i.e., to authorize the wireless terminal to receive multicast messages for the multicast group.

Referring to FIG. 4, at steps 100 and 102, the wireless terminal may send a JOIN message to MSM 40. More particularly, at step 100, the wireless terminal would send the JOIN message to the PDSN 30, via the BSS, and, at step 102, the PDSN 30 would forward the message to the MSM 40 (per a destination address specified with the message, for instance). The JOIN message is preferably an IP-based message that serves as a request by the wireless terminal to join a multicast group, so as to receive a particular class or set of multicast messages, such as messages pertaining to weather, sports or stock market information for instance.

In the exemplary embodiment, the wireless terminal programmatically generate the JOIN message and include in the JOIN message an indication of the particular multicast group that the terminal desires to join, as requested by a user of the terminal for instance. Each of various multicast groups could be identified by a respective code or label or in some other way. The wireless terminal will then transmit the JOIN message to the MSM 40, and MSM 40 may apply program logic to read and process the JOIN message.

The MSM 40 will preferably first determine whether the wireless terminal is authorized to join the designated multicast group. To do so, the MSM 40 may programmatically communicate with a registrar, such as AAA server 42. For instance, at step 104, the MSM 40 may send an ACCESS request to the AAA server 42 to determine whether the wireless terminal is authorized to join the multicast group. AAA server 42 can maintain, separately or as part of a subscriber profile, a record of the wireless terminals that are authorized members of particular multicast groups. AAA server 42 could thus programmatically refer to that record in order to determine whether to grant or deny the ACCESS request. At step 106, the AAA server 42 may then send to the MSM 40 an access reply that indicates whether the wireless terminal is authorized join the multicast group.

At step 108, the MSM 40 may next send a join reply to the wireless terminal. The join reply indicates whether the wireless terminal is authorized to join the requested multicast group. If the wireless terminal is not authorized, then the wireless network will preferably not allow the wireless terminal to receive messages sent to the multicast group. On the other hand, if the wireless terminal is authorized, then the wireless network will preferably allow the wireless terminal to receive messages sent to the multicast group. To accomplish that, the MSM 40 will preferably include in the join reply a multicast IP address to which the wireless terminal should listen, and/or a filter, key or mask that the wireless terminal can use to read messages sent to that multicast IP address, i.e., messages sent to the multicast group.

Further, a wireless terminal can de-register from a multicast group through suitable signaling with the MSM as well. For instance, the wireless terminal may send a JOIN message to the MSM, containing a de-registration parameter, and the MSM may respond with a join reply acknowledging that the wireless terminal has de-registered from the group.

When a wireless terminal joins at least one multicast group, the wireless terminal will be considered to be in a multicast state. When in the multicast state, the wireless terminal will preferably monitor the common multicast radio link of the cell sector in which the wireless terminal is operating. When the wireless terminal receives a message on that common multicast radio link that is destined to the multicast IP address, the wireless terminal may then apply its filter, key or mask to read the message from the message. On the other hand, if the wireless terminal is not a member of at least one multicast group, then the wireless terminal will be considered to be in a non-multicast state. When in the non-multicast state, the wireless terminal will preferably not monitor the common multicast radio link of the cell sector in which the wireless terminal is operating. Preferably, the wireless terminal will maintain in data storage a Boolean flag indicating whether it is currently in the multicast state or not.

c. Managing Active/Inactive Status of Multicast Links

According to the exemplary embodiment, the PDSN 30 will monitor, per cell sector that the PDSN serves, how many wireless terminals currently operating in the cell sector are in the multicast state. When the number transitions from zero to at least one for a given cell sector, the PDSN will then switch the multicast link for that cell sector to active. On the other hand, when the number transitions to zero for a given cell sector (i.e., when the last wireless terminal that was in the cell sector in the multicast state transitions to the non-multicast state or exits the cell sector), the PDSN will switch the multicast link for that cell sector to inactive.

To accomplish this, in a preferred embodiment, the PDSN 30 may maintain in data storage a sector-state table that indicates, per cell sector, the number of wireless terminals currently in the multicast state. FIG. 5 depicts such a table. As shown in FIG. 5, there are currently no wireless terminals in cell sector A or C that are in the multicast state, but there is currently one wireless terminal in cell sector B that is in the multicast state. The example table includes another column as well, which indicates the status of the multicast link for each cell sector. Because no wireless terminals in cell sectors A or C are in the multicast state, the multicast links for cell sectors A and C are in the inactive state. However, because at least one wireless terminal in cell sector B is in the multicast state, the multicast link for cell sector B is in the active state. I suitable table could omit this last column, since the multicast link state follows logically from the count in the preceding column. However, the last column is shown for purposes of illustration.

The PDSN 30 will preferably keep the sector-state table up to date by reading the join reply messages sent from the MSM to wireless terminals and updating the table when a wireless terminal in a given cell sector joins a multicast group or de-registers from a multicast group.

Initially, the sector-state table may indicate for each cell sector that no wireless terminals in the sectors are currently in the multicast state. When MSM 40 sends a join reply to a wireless terminal, the PDSN 30 will programmatically read the reply (sniffing the contents as it transmits it along to its destination) to determine whether the MSM 40 has granted a request to join or de-register from a multicast group. If the MSM has granted a request to join a multicast group, then the PDSN will increment the count of wireless terminals for the cell sector in which the wireless terminal is operating. Similarly, if the MSM 40 grants a request to de-register from a multicast group, then the PDSN will decrement the count of wireless terminals for the cell sector in which the wireless terminal is operating.

In order for the PDSN to be able to increment or decrement the appropriate cell sector's count in the sector-state table, the PDSN will need to know which cell sector the wireless terminal is operating in. The PDSN can learn this information in various ways. By way of example, the wireless terminal could include an indication of its current cell sector within the JOIN message that it sends, and the MSM can include that cell sector indication in the join reply that it sends, so the PDSN can read the indication of cell sector from the join reply. As another example, if the join reply includes an identifier of the wireless terminal, the PDSN can query an entity such as a home location register (HLR, not shown) or BSC 28 (or other entity that has a record of the wireless terminal's current cell sector) for instance to find out what cell sector the wireless terminal is currently operating in. As still another example, the PDSN could query a handset-based or network-based position-determining system to find out the geographic position of the wireless terminal and the PDSN or some other entity, operating to assist the PDSN, could translate that geographic position into a cell sector identity.

Advantageously, this process will work to keep track of multiple group memberships of a given wireless terminal. That is, as a wireless terminal joins two multicast groups by engaging in the join process twice, the PDSN would increment the count for the wireless terminal's cell sector twice. In turn, if the wireless terminal de-registers from one of the groups but remains in the other group, the PDSN would still have a count of at least one for that cell sector so would still send multicast messages on the multicast link of that cell sector.

Further, the process can also work to facilitate updates of the sector-state table as a wireless terminal moves between cell sectors. For instance, when a wireless terminal that is in the multicast state moves from cell sector A to cell sector B, the wireless terminal could programmatically send a new JOIN message to the MSM, and the MSM could send a join reply to the wireless terminal, granting group membership. When the PDSN detects this join reply, the PDSN would then increment the wireless terminal count for cell sector B in the state-table, and the PDSN would decrement the wireless terminal count for cell sector A in the state-table.

Figure 6:
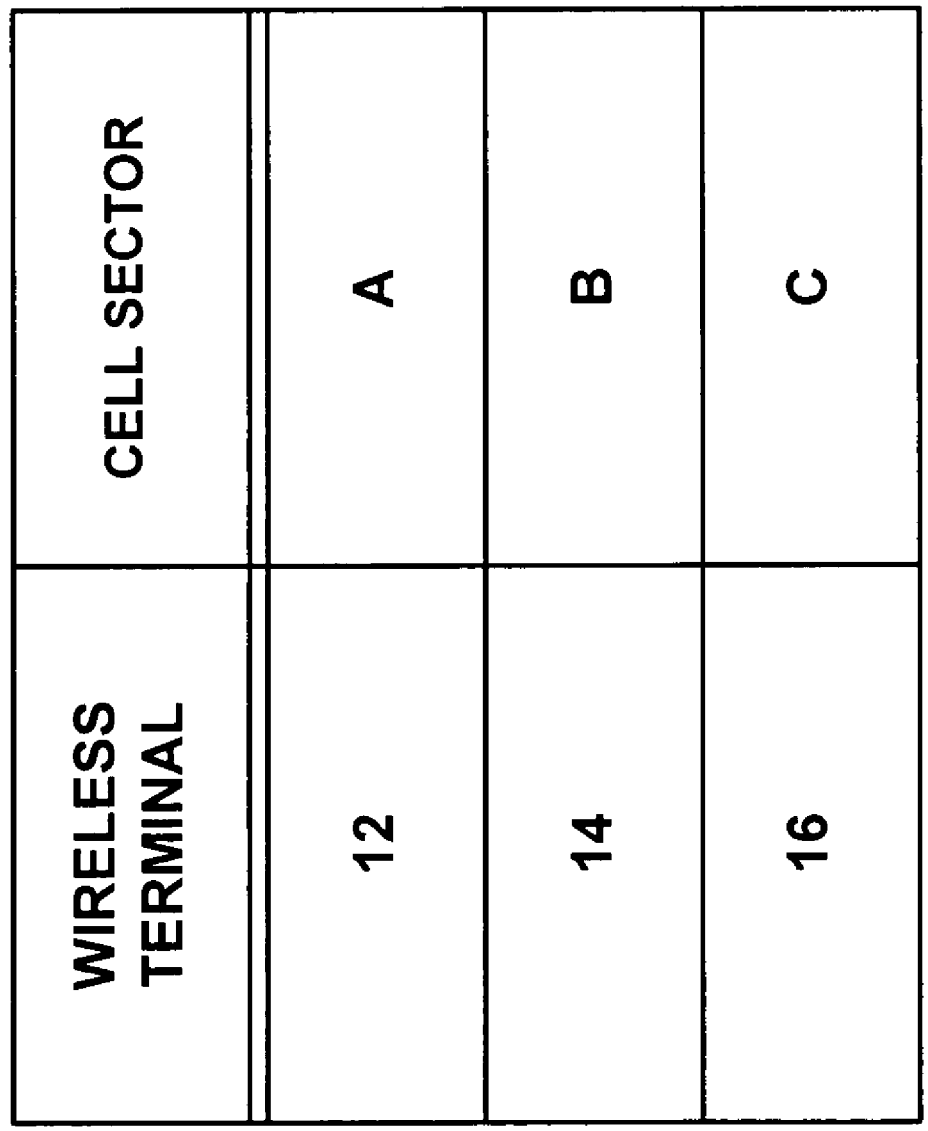
FIG. 6 is a wireless terminal table indicating which cell sectors wireless terminals were in when then most recently joined a multicast group.

To accomplish this, the PDSN may also maintain in data storage a wireless terminal table that indicates the cell sector in which each wireless terminal is operating when it joins a multicast group. FIG. 6 depicts such a table. Each time a wireless terminal joins a multicast group (as indicated by a join reply passing from the MSM to the wireless terminal), the PDSN can record in this table an indication of the wireless terminal's current cell sector (as determined in one of the ways described above, for instance). When a wireless terminal that is in the multicast state moves from sector A to sector B and the PDSN then receives a join reply indicating that the wireless terminal has joined a multicast group, the PDSN may thus conveniently determine from the wireless terminal table that the wireless terminal was already a group member while in sector A and is now a group member while in sector B. Thus, the PDSN may decrement the count in the sector-state table for cell sector A, while incrementing the count for sector B. (Further, the PDSN may update the wireless terminal table to indicate that the wireless terminal most recently joined a multicast group while in sector B.)

d. Sending Multicast Data

In the exemplary embodiment, the PDSN 30 will function as an IP router to which multicast packets will be directed. Conventional multicast routing techniques can be applied in this regard. Upon receipt of multicast packets, the PDSN 30 will then send the packets along any active multicast link(s) to one or more cell sectors, for receipt by wireless terminals in the multicast state.

Figure 7:
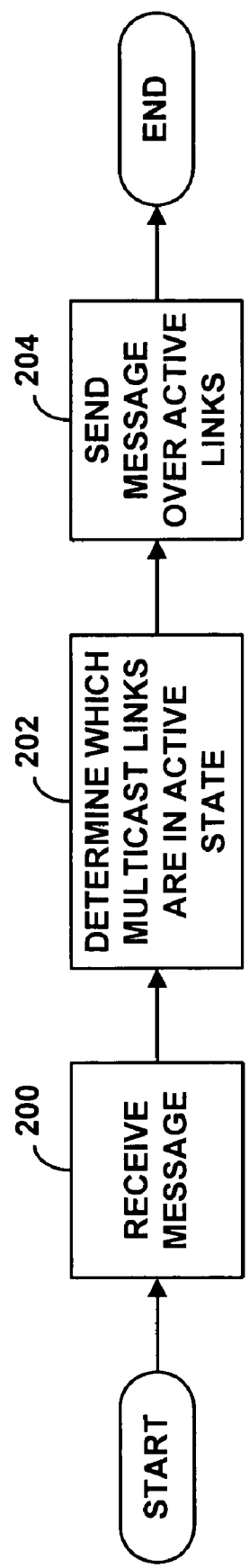
FIG. 7 is a flow chart illustrating a process for sending multicast messages in accordance with the exemplary embodiment.

FIG. 7 is a flow chart depicting an example of how the PDSN could manage transmission of multicast messages over multicast links. For purposes of this example, assume that the wireless terminals in cell sectors A and C are in the non-multicast state (i.e., are not currently authorized to receive multicast messages), and the wireless terminals in cell sector B are in the multicast state (i.e., are currently authorized to receive multicast messages). Therefore, the multicast links for cell sectors A and B are inactive, and the multicast link for cell sector B is active.

Periodically, or based on triggers from other network entities or wireless terminals, MAS 38 may transmit a multicast message. At step 200 in FIG. 7, PDSN 30 would receive the message. At step 202, the PDSN would then refer to the sector-state table of FIG. 5 to determine which multicast links are in the active state. Thus, in this example, the PDSN would thereby determine that the multicast links for cell sectors A and C are in the inactive state but the multicast link for cell sector B is in the active state.

At step 204, the PDSN 30 would then send a copy of the message over the multicast link for cell sector B, to the BSS. More particularly, the PDSN will send the message over the multicast R-P link for cell sector B to BSC 28, and BSC 28 would then send the message to BTS 22 for transmission on the common multicast radio link in cell sector B. Assuming that wireless terminal 14 is in the multicast state in cell sector B, wireless terminal 14 would thus receive the message transmitted on the multicast radio link (perhaps using a mask, filter or key to read the message). Wireless terminal 14 could then render the message for display to a user. On the other hand, the PDSN would not send the message on the multicast links of cell sectors A and C, since those multicast links are inactive.

3. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. In a wireless network having a packet gateway communicatively coupled to a base station system (BSS), wherein the packet gateway provides connectivity with a packet network, and wherein the BSS includes an antenna system that radiates to define a plurality of wireless cell sectors for one or more wireless terminals, wherein each of the one or more wireless terminals has a multicast state and a non-multicast state, a method comprising:

for each of the wireless cell sectors, providing a respective multicast link between the packet gateway and the BSS, so that multiple multicast links exist concurrently between the packet gateway and the BSS, wherein each multicast link has an active state and an inactive state;

causing the multicast link for a given wireless cell sector to be in the active state when at least one wireless terminal in the given wireless coverage area is in the multicast state; and causing the multicast link for the given wireless cell sector to be in the inactive state when no wireless terminal in the given wireless coverage area is in the multicast state, wherein the multicast link for each wireless coverage area is a radio-packet link conforming to an A10/A11 standard.

2. The method of claim 1, further comprising transitioning the multicast link for the given wireless coverage area into the active state when at least one wireless terminal in the multicast state enters the given wireless coverage area.

3. The method of claim 1, further comprising transitioning the multicast link for the given wireless coverage area into the active state when at least one wireless terminal in the given wireless coverage area enters the multicast state.

4. The method of claim 1, further comprising transitioning the multicast link for the given wireless coverage area into the inactive state when a last wireless terminal in the multicast state exits the given wireless cell sector.

5. The method of claim 1, wherein providing the respective multicast link between the packet gateway and the BSS comprises providing the respective multicast link during a power-up of the packet gateway.

6. The method of claim 1, further comprising:
receiving a multicast message;
transmitting a copy of the multicast message over each multicast link in the active state; and
not transmitting a copy of the multicast message over any multicast link that is in the inactive state.

7. A system comprising:
a base station system (BSS) arranged to have an antenna system that radiates to define a plurality of wireless cell sectors for one or more wireless terminals, wherein each of the one or more wireless terminals has a multicast state and a non-multicast state;
a packet gateway communicatively coupled to the BSS, wherein the packet gateway provides connectivity with a packet network;
a processor;
data storage; and
computer instructions stored in the data storage and executable by the processor for performing the functions of:
for each of the wireless cell sectors, providing a respective multicast link between the packet gateway and the BSS, so that multiple multicast links exist concurrently between the packet gateway and the BSS, wherein each multicast link has an active state and an inactive state,
causing the multicast link for a given wireless cell sector to be in the active state when at least one wireless terminal in the given wireless coverage area is in the multicast state, and
causing the multicast link for the given wireless cell sector to be in the inactive state when no wireless terminal in the given wireless coverage area is in the multicast state,
wherein the multicast link for each wireless coverage area is a radio-packet link conforming to an A10/A11 standard.

8. The system of claim 7, further comprising computer instructions executable by the processor for determining that at least one wireless terminal in the given wireless coverage area is in the multicast state and responsively transitioning the multicast link for the given wireless coverage area to be in the active state.

9. The system of claim 7, further comprising computer instructions executable by the processor for determining that no wireless terminal in the given wireless coverage area is in the multicast state and responsively transitioning the multicast link for the given wireless coverage area to be in the inactive state.

10. The system of claim 7, wherein the computer instructions for providing the respective multicast link between the packet gateway and the BSS comprises computer instructions for providing the respective multicast link during a power-up of the packet gateway.

11. The system of claim 7, further comprising computer instructions executable by the processor for (i) receiving a multicast message, (ii) transmitting a copy of the multicast message over each multicast link in the active state, and (iii) not transmitting a copy of the multicast message over any multicast link that is in the inactive state.

* * * * *